(12) United States Patent
Morikawa

(10) Patent No.: US 10,491,781 B2
(45) Date of Patent: Nov. 26, 2019

(54) CONTROLLER AND STORAGE MEDIUM STORING COMPUTER PROGRAM

(71) Applicant: Brother Kogyo Kabushiki Kaisha, Nagoya-shi, Aichi-ken (JP)

(72) Inventor: Shota Morikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/247,695

(22) Filed: Jan. 15, 2019

(65) Prior Publication Data

US 2019/0222716 A1 Jul. 18, 2019

(30) Foreign Application Priority Data

Jan. 18, 2018 (JP) .................................. 2018-006794

(51) Int. Cl.
- *H04N 1/387* (2006.01)
- *G06F 3/12* (2006.01)
- *H04N 1/60* (2006.01)

(52) U.S. Cl.
CPC ......... *H04N 1/3877* (2013.01); *G06F 3/1208* (2013.01); *G06F 3/1256* (2013.01); *H04N 1/6008* (2013.01)

(58) Field of Classification Search
None
See application file for complete search history.

(56) References Cited

U.S. PATENT DOCUMENTS

| 9,359,160 | B2 | 6/2016 | Yoshida et al. |
| 9,707,779 | B2 | 7/2017 | Yoshida et al. |
| 2008/0129778 | A1 | 6/2008 | Maeda |
| 2011/0148956 | A1* | 6/2011 | Nakahara ............... H04N 1/502 347/2 |
| 2015/0035891 | A1* | 2/2015 | Yoshida ................. B41J 11/005 347/16 |
| 2016/0229204 | A1 | 8/2016 | Yoshida et al. |

FOREIGN PATENT DOCUMENTS

| JP | 2008-155621 A | 7/2008 |
| JP | 2011-126264 A | 6/2011 |
| JP | 2013-107320 A | 6/2013 |
| JP | 2015-030149 A | 2/2015 |

* cited by examiner

*Primary Examiner* — Andrew H Lam
(74) *Attorney, Agent, or Firm* — Banner & Witcoff, Ltd.

(57) ABSTRACT

A controller performs: acquiring target image data; calculating a particular value of a first end image by using the target image data, the first end image being an image to be printed in a first end region parallel to a first end of a print medium; determining print processing to be performed by using the particular value, including: when a particular condition is satisfied, determining first print processing as the print processing, the particular condition including a first condition that uniformity of the first end image is higher than or equal to a first standard; and when the particular condition is not satisfied, determining second print processing as the print processing, the first print processing being processing in which banding is less likely to occur in the first end image than the second print processing; and controlling the printer to print an image based on the target image data.

20 Claims, 11 Drawing Sheets

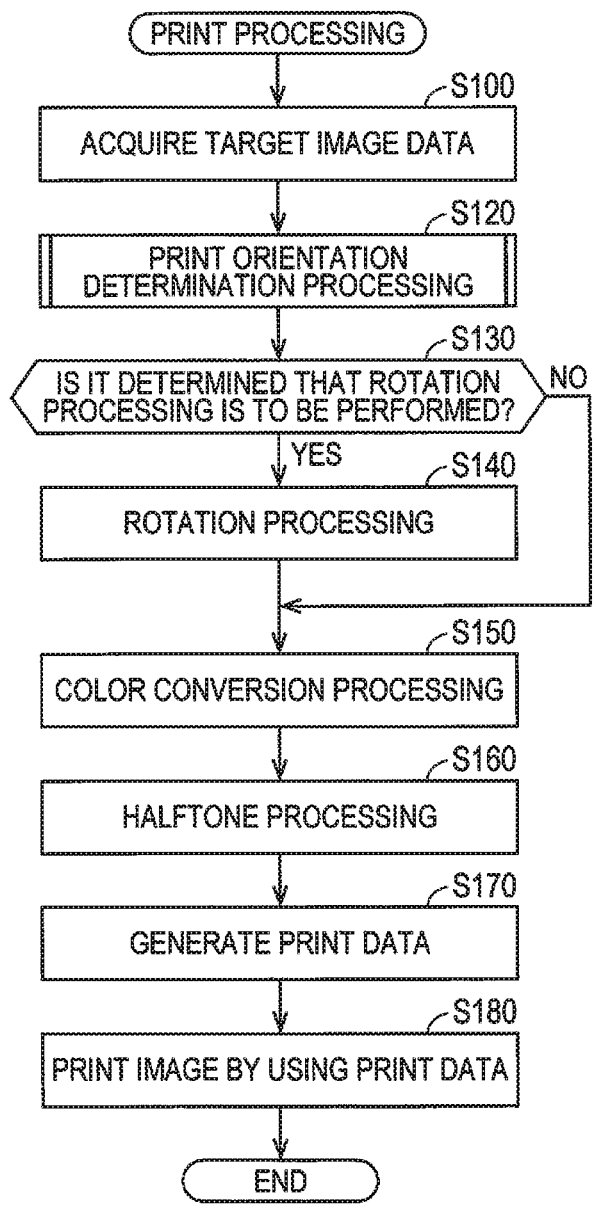

CONTROLLER AND STORAGE MEDIUM STORING COMPUTER PROGRAM

CROSS REFERENCE TO RELATED APPLICATIONS

This application claims priority from Japanese Patent Application No. 2018-006794 filed Jan. 18, 2018. The entire content of the priority application is incorporated herein by reference.

TECHNICAL FIELD

This disclosure relates to a controller and a storage medium storing a computer program.

BACKGROUND

A known inkjet recording device changes an orientation of an image at the time of printing, so as to arrange characters or graphics in which streak noise is unnoticeable at a position where streak noise tends to be produced in relation to a print head.

SUMMARY

According to one aspect, this specification discloses a controller for a printer including: a print head having a plurality of nozzles configured to eject ink; a head driver configured to drive the print head to eject ink to form dots on a print medium; and a conveyor configured to convey the print medium in a conveyance direction. The conveyor includes an upstream holder and a downstream holder. The upstream holder is provided at an upstream side of the print head in the conveyance direction and configured to hold the print medium. The downstream holder is provided at a downstream side of the print head in the conveyance direction and configured to hold the print medium. The printer is configured to perform printing by formation of the dots by the print head and by conveyance of the print medium by the conveyor. The controller is configured to perform: acquiring target image data indicative of a target image; calculating a particular value of a first end image of the target image by using the target image data, the first end image being an image to be printed in a first end region parallel to a first end of the print medium, the first end being one of an upstream end and a downstream end of the print medium in the conveyance direction, the first end region including a region to be printed in one of a first holding state in which the print medium is held by the downstream holder without being held by the upstream holder and a second holding state in which the print medium is held by the upstream holder without being held by the downstream holder, the particular value including a first value indicative of a degree of uniformity of the first end image; determining print processing to be performed by using the particular value, the determining including: in response to determining that a particular condition is satisfied, determining first print processing as the print processing to be performed, the particular condition including a first condition that the uniformity of the first end image indicated by the first value is higher than or equal to a first standard; and in response to determining that the particular condition is not satisfied, determining second print processing as the print processing to be performed, the first print processing being processing in which banding is less likely to occur in the first end image than the second print processing; and controlling the printer to print an image based on the target image data by performing the determined print processing to be performed.

According to another aspect, this specification also discloses a controller for a printer including: a print head having a plurality of nozzles configured to eject ink; a head driver configured to drive the print head to eject ink to form dots on a print medium; and a conveyor configured to convey the print medium in a conveyance direction. The conveyor includes an upstream holder and a downstream holder. The upstream holder is provided at an upstream side of the print head in the conveyance direction and configured to hold the print medium. The downstream holder is provided at a downstream side of the print head in the conveyance direction and configured to hold the print medium. The printer is configured to perform printing by formation of the dots by the print head and by conveyance of the print medium by the conveyor. The controller is configured to perform: acquiring target image data indicative of a target image; acquiring weight information indicative of weights for respective ones of a plurality of color values represented by a particular color space, a first weight corresponding to a first color being smaller than a second weight corresponding to a second color, banding of the second color being more noticeable than banding of the first color; calculating a particular value of a first end image of the target image by using the target image data, the first end image being an image to be printed in a first end region parallel to a first end of the print medium, the first end being one of an upstream end and a downstream end of the print medium in the conveyance direction, the first end region including a region to be printed in one of a first holding state in which the print medium is held by the downstream holder without being held by the upstream holder and a second holding state in which the print medium is held by the upstream holder without being held by the downstream holder, the particular value including a first value that is calculated by using the weights indicated by the weight information and the plurality of color values indicative of colors in the first end image; determining print processing to be performed by using the particular value, the determining including: in response to determining that a particular condition is satisfied, determining first print processing as the print processing to be performed, the particular condition including a first condition that the first value is larger than or equal to a first standard; and in response to determining that the particular condition is not satisfied, determining second print processing as the print processing to be performed, the first print processing being processing in which banding is less likely to occur in the first end image than the second print processing; and controlling the printer to print an image based on the target image data by performing the determined print processing to be performed.

According to still another aspect, this specification also discloses a non-transitory computer-readable storage medium storing a program executable on a computer for a printer. The printer includes: a print head having a plurality of nozzles configured to eject ink; a head driver configured to drive the print head to eject ink to form dots on a print medium; and a conveyor configured to convey the print medium in a conveyance direction, the conveyor including an upstream holder and a downstream holder, the upstream holder being provided at an upstream side of the print head in the conveyance direction and configured to hold the print medium, the downstream holder being provided at a downstream side of the print head in the conveyance direction and configured to hold the print medium, the printer being configured to perform printing by formation of the dots by the print head and by conveyance of the print medium by the conveyor. The program causes, when executed, the computer to perform operations including: an image acquiring operation of acquiring target image data indicative of a target image; a calculating operation of calculating a particular value of a first end image of the target image by using the target image data, the first end image being an image to be printed in a first end region parallel to a first end of the print medium, the first end being one of an upstream end and a downstream end of the print medium in the conveyance direction, the first end region including a region to be printed in one of a first holding state in which the print medium is held by the downstream holder without being held by the upstream holder and a second holding state in which the print medium is held by the upstream holder without being held by the downstream holder, the particular value including a first value indicative of a degree of uniformity of the first end image; a processing determining operation of determining print processing to be performed by using the particular value, the processing determining operation including: in response to determining that a particular condition is satisfied, determining first print processing as the print processing to be performed, the particular condition including a first condition that the uniformity of the first end image indicated by the first value is higher than or equal to a first standard; and in response to determining that the particular condition is not satisfied, determining second print processing as the print processing to be performed, the first print processing being processing in which banding is less likely to occur in the first end image than the second print processing; and a print controlling operation of controlling the printer to print an image based on the target image data by performing the determined print processing to be performed.

According to still another aspect, this specification also discloses a non-transitory computer-readable storage medium storing a program executable on a computer for a printer. The printer includes: a print head having a plurality of nozzles configured to eject ink; a head driver configured to drive the print head to eject ink to form dots on a print medium; and a conveyor configured to convey the print medium in a conveyance direction, the conveyor including an upstream holder and a downstream holder, the upstream holder being provided at an upstream side of the print head in the conveyance direction and configured to hold the print medium, the downstream holder being provided at a downstream side of the print head in the conveyance direction and configured to hold the print medium, the printer being configured to perform printing by formation of the dots by the print head and by conveyance of the print medium by the conveyor. The program causes, when executed, the computer to perform operations including: an image acquiring operation of acquiring target image data indicative of a target image; a weight acquiring operation of acquiring weight information indicative of weights for respective ones of a plurality of color values represented by a particular color space, a first weight corresponding to a first color being smaller than a second weight corresponding to a second color, banding of the second color being more noticeable than banding of the first color; a calculating operation of calculating a particular value of a first end image of the target image by using the target image data, the first end image being an image to be printed in a first end region parallel to a first end of the print medium, the first end being one of an upstream end and a downstream end of the print medium in the conveyance direction, the first end region including a region to be printed in one of a first holding state in which the print medium is held by the downstream holder without being held by the upstream holder and a second holding state in which the print medium is held by the upstream holder without being held by the downstream holder, the particular value including a first value that is calculated by using the weights indicated by the weight information and the plurality of color values indicative of colors in the first end image; a processing determining operation of determining print processing to be performed by using the particular value, the processing determining operation including: in response to determining that a particular condition is satisfied, determining first print processing as the print processing to be performed, the particular condition including a first condition that the first value is larger than or equal to a first standard; and in response to determining that the particular condition is not satisfied, determining second print processing as the print processing to be performed, the first print processing being processing in which banding is less likely to occur in the first end image than the second print processing; and a print controlling operation of controlling the printer to print an image based on the target image data by performing the determined print processing to be performed.

The technique disclosed in this specification may be realized in various modes and, for example, may be realized in modes such as a printer, a terminal apparatus, a server, a method of realizing functions of these apparatuses, a computer program, and a storage medium storing a computer program.

BRIEF DESCRIPTION OF THE DRAWINGS

Embodiments in accordance with this disclosure will be described in detail with reference to the following figures wherein:

FIG. 9 is a flowchart of print processing;

DETAILED DESCRIPTION

However, an end portion image which is located at an end portion of a print medium in a conveyance direction tends to be printed in a state where the print medium is unstable. In the technique described above, there is a possibility that banding occurring in the end portion image is not suppressed.

According to one aspect, the present specification discloses a technique which appropriately suppresses the occurrence of banding in an end portion image that is printed on a print medium.

A. Embodiments

Figure 1:
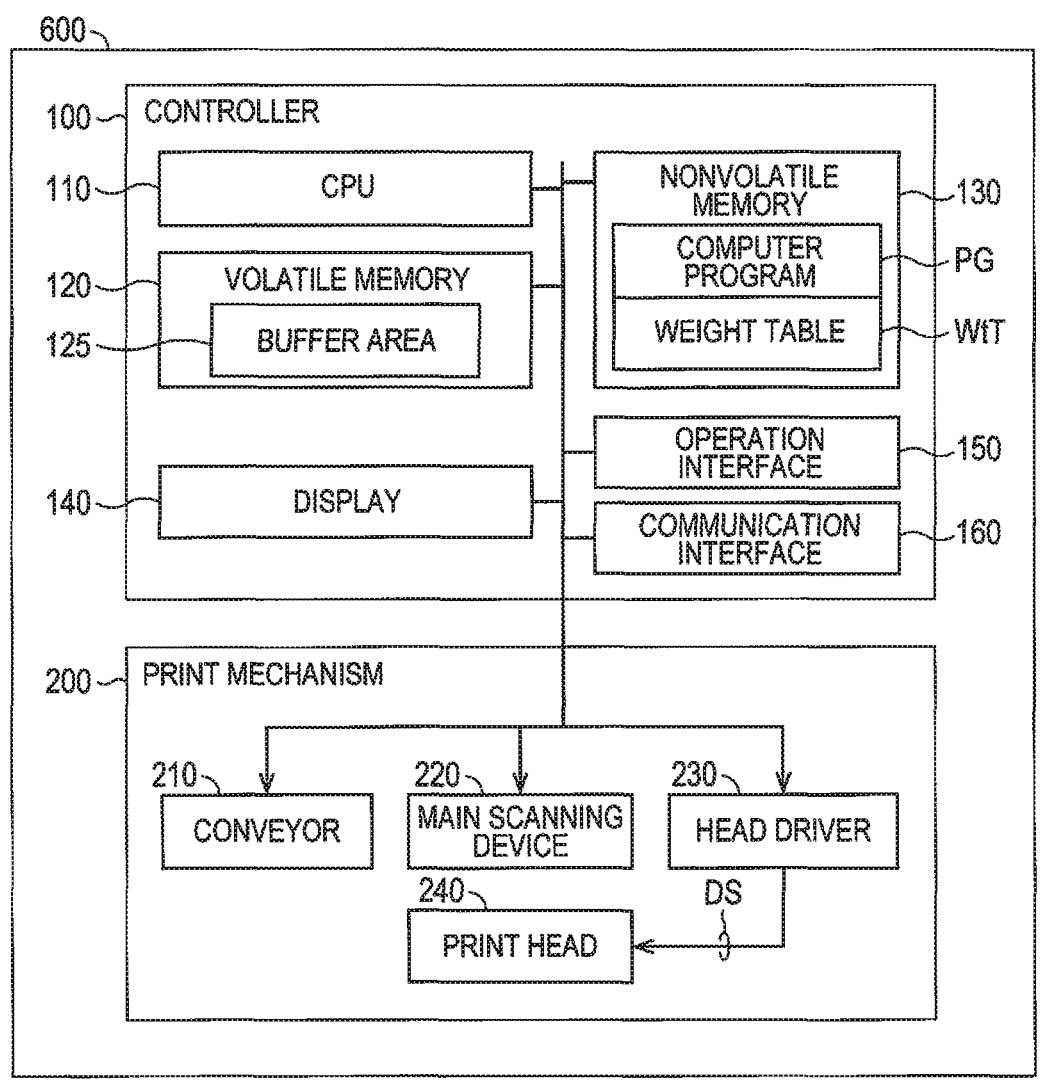
FIG. 1 is a block diagram showing the configuration of a printer 600 in an embodiment.

A-1. Configuration of Print Device:

An embodiment of this disclosure will next be described based on an example. The printer 600 shown in FIG. 1 is an inkjet printer which forms dots of ink on a sheet so as to perform printing. The printer 600 includes a controller 100 which controls the entire printer and a print mechanism 200 which performs printing.

The controller 100 includes a CPU 110, a volatile memory 120 such as a DRAM, a nonvolatile memory 130 such as a flash memory and a hard disk drive, a display 140 such as a liquid crystal display, an operation interface 150 which includes buttons and a touch panel superimposed on the panel of the liquid crystal display, and a communication interface 160 for communication with an external device such as a personal computer (not shown).

In the volatile memory 120, a buffer region 125 is provided in which various types of intermediate data generated when the CPU 110 performs processing are temporarily stored. In the nonvolatile memory 130, a computer program PG for controlling the printer 600 and a weight table WtT are stored.

The computer program PG and the weight table WtT are stored in the nonvolatile memory 130 prior to shipment of the printer 600. The computer program PG and the weight table WtT are provided in a form in which they are stored in a DVD-ROM and so on or in a form in which they are downloaded from a server. The CPU 110 executes the computer program PG so as to realize control processing on the printer 600 which will be described later. The weight table WtT will be described later.

The print mechanism 200 ejects, according to the control of the CPU 110 in the controller 100, ink of cyan (C), magenta (M), yellow (Y) and black (K) so as to perform printing. The print mechanism 200 includes a conveyor 210, a main scanning device 220, a head driver 230, and the print head 240. The conveyor 210 includes a conveyance motor (not shown) so as to convey, by power of the conveyance motor, a sheet of paper serving as a print medium in a conveyance direction. The main scanning device 220 includes a main scanning motor (not shown) which causes, by power of the main scanning motor, the print head 240 to reciprocate in a main scanning direction (this is also referred to as main scanning) The head driver 230 supplies, while the main scanning device 220 is performing the main scanning with the print head 240, a drive signal DS to the print head 240 so as to drive the print head 240. The print head 240 ejects, according to the drive signal DS, ink onto the sheet being conveyed by the conveyor 210 so as to form dots.

Figure 2:
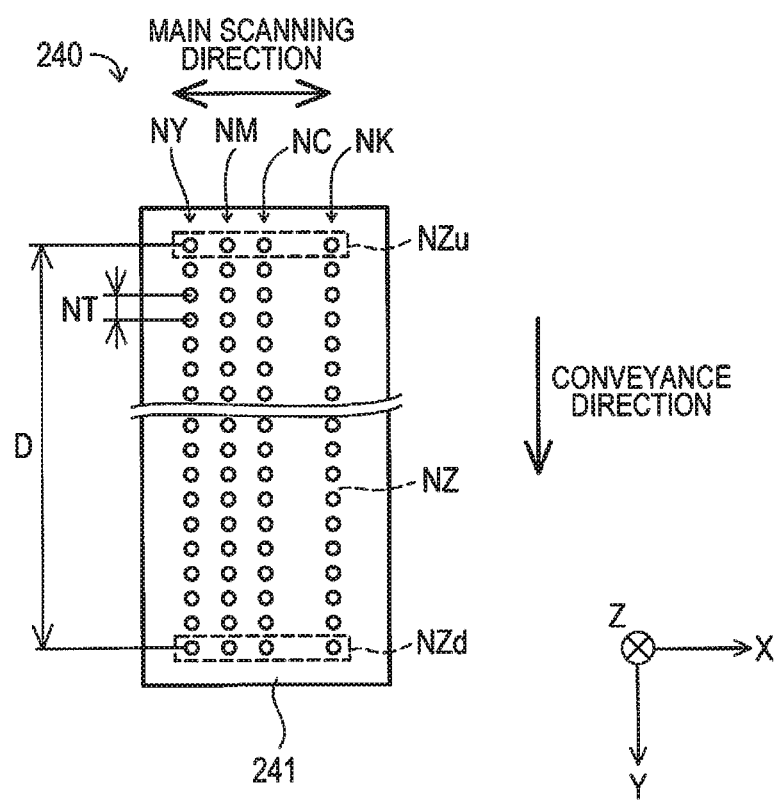
FIG. 2 is a diagram showing a schematic configuration of a print head 240.

As shown in FIG. 2, in a nozzle surface 241 (a surface on a −Z side) of the print head 240, nozzle arrays NC, NM, NY and NK are formed which eject each of ink of C, M, Y and K described above. Each of the nozzle arrays includes a plurality of nozzles NZ. The positions of the nozzles NZ in the conveyance direction are different from each other, and the nozzles NZ are aligned at particular nozzle intervals NT along the conveyance direction. In the drawings subsequent to FIG. 2, a +Y direction indicates the conveyance direction (subscanning direction) of the sheet, and an X direction indicates the main scanning direction. Among the nozzles NZ included in each of the nozzle arrays, the nozzle NZ which is located at a downstream end in the conveyance direction, that is, at an end on a +Y side in FIG. 2 is also referred to as the most downstream nozzle NZd, and the nozzle NZ which is located at an upstream end in the conveyance direction, that is, at an end on a −Y side in FIG. 2 is also referred to as the most upstream nozzle NZu. A length from the most upstream nozzle NZu to the most downstream nozzle NZd in the conveyance direction is also referred to as a nozzle length D.

Figure 3A:
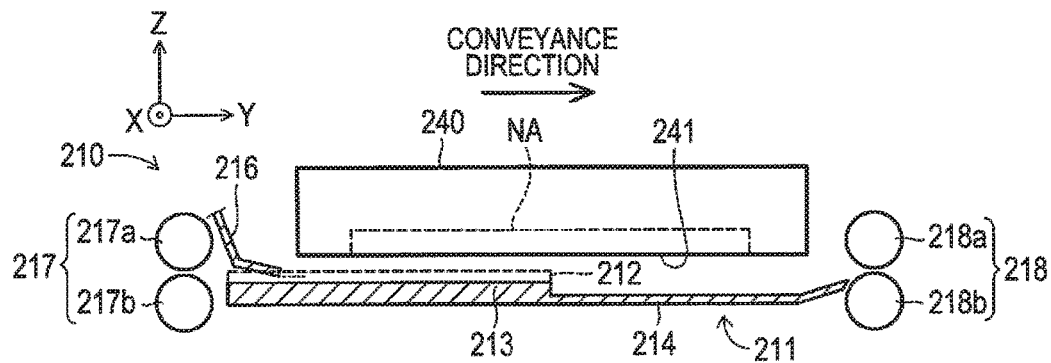
FIGS. 3A to 3C are diagrams showing a schematic configuration of a conveyor 210.

As shown in FIG. 3A, the conveyor 210 includes a platen 211, an upstream roller pair 217, a downstream roller pair 218, and a plurality of pressing members 216 for holding and conveying the sheet.

The upstream roller pair 217 is provided at an upstream side (the −Y side) of the print head 240 in the conveyance direction, and the downstream roller pair 218 is provided at a downstream side (the +Y side) of the print head 240 in the conveyance direction. The upstream roller pair 217 includes a drive roller 217a which is driven by the conveyance motor (not shown) and a follow roller 217b which is rotated according to the rotation of the drive roller 217a. Likewise, the downstream roller pair 218 includes a drive roller 218a and a follow roller 218b. Alternatively of the follow roller, a plate member may be adopted and the sheet may be held by the drive roller and the plate member.

The platen 211 is arranged in a position which is between the upstream roller pair 217 and the downstream roller pair 218 and which faces the nozzle surface 241 of the print head 240. The pressing members 216 are arranged between the upstream roller pair 217 and the print head 240.

Figure 3B:
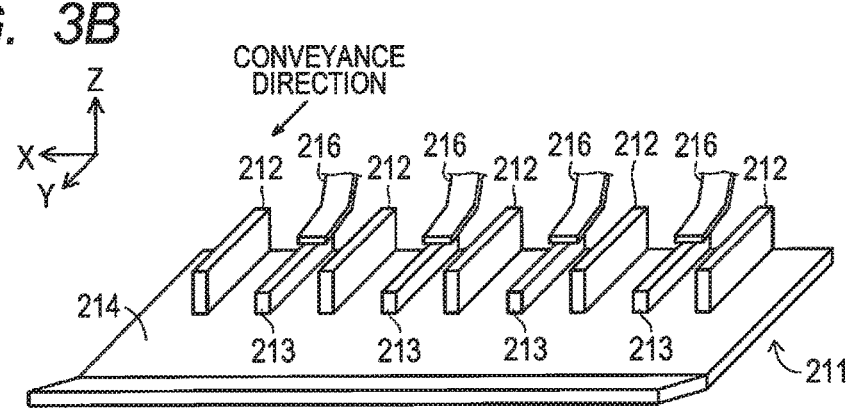
Figure 3C:
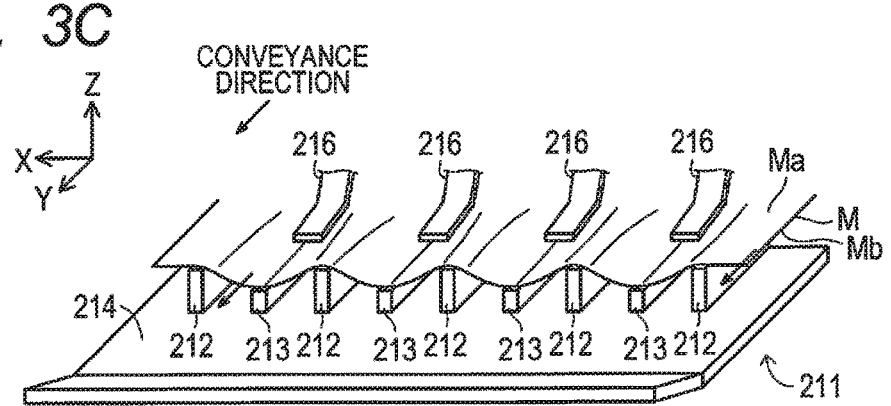

FIGS. 3B and 3C show perspective views of the platen 211 and the pressing members 216. FIG. 3B shows a state where a sheet M is not supported, and FIG. 3C shows a state where the sheet M is supported. The platen 211 includes a plurality of high support members 212, a plurality of low support members 213, and a flat plate 214.

The flat plate 214 is a plate member which is substantially parallel to the main scanning direction (the X direction) and the conveyance direction (the +Y direction). The end portion of the flat plate 214 at the −Y side is located in the vicinity of the upstream roller pair 217. The end portion of the flat plate 214 at the +Y side is located in the vicinity of the downstream roller pair 218.

The high support members 212 and the low support members 213 are alternately arranged on the flat plate 214 along the X direction. In other words, each of the low support members 213 is arranged between the two high support members 212 adjacent the low support member 213. The high support members 212 are ribs which are extended along the Y direction. The end portions of the high support members 212 at the −Y side are located on the end portion of the flat plate 214 at the −Y side. The end portions of the high support members 212 at the +Y side are located in a central portion of the flat plate 214 in the Y direction. The positions of both ends of the low support members 213 in the Y direction are the same as those of both ends of the high support members 212 in the Y direction.

The pressing members 216 are arranged at the positions of the low support members 213 on a +Z side. The positions of the pressing members 216 in the X direction are the same as those of the low support members 213 in the X direction. In other words, the position of each of the pressing members 216 in the X direction is located between the two high support members 212 adjacent to the pressing member 216. The pressing members 216 are plate members which are inclined so as to approach the low support members 213 toward the +Y direction. The end portions of the pressing members 216 at the +Y side are located between the end portion of the print head 240 at the −Y side and the upstream roller pair 217.

It can be said that the high support members 212, the low support members 213, and the pressing members 216 are arranged at positions closer to the upstream roller pair 217 than to the downstream roller pair 218, and are provided at the upstream roller pair 217 side between the upstream roller pair 217 and the downstream roller pair 218.

As shown in FIG. 3C, when the sheet M is conveyed, the high support members 212 and the low support members 213 support the sheet M from the side of a surface Mb opposite to a print surface, and the pressing members 216 support the sheet M from the print surface Ma side. The sheet M is supported by the high support members 212, the low support members 213, and the pressing members 216 in a state where the sheet M is deformed to be wavy along the X direction (FIG. 3C). Then, the sheet M is conveyed in the conveyance direction (the +Y direction) in the state where the sheet M is deformed to be wavy. The sheet M is deformed to be wavy, and thus the rigidity of the sheet M against deformation along the Y direction is enhanced. Consequently, it is suppressed that the sheet M is deformed to be warped along the Y direction such that the sheet M is floated from the platen 211 to the print head 240 side or that the sheet M is hung to the platen 211 side. When the sheet M is floated or the sheet M is hung, the positions where the dots are formed are displaced, and thus the quality of a printed image is lowered, for example, the image quality is lowered due to banding. When the sheet M is floated, the sheet M makes contact with the print head 240 and becomes dirty.

A-2. Operation of Print Mechanism 200

The CPU 110 controls the print mechanism 200 to alternately repeat subscanning processing and main scanning processing, and thereby prints an image on the sheet M. By one round of subscanning processing, the CPU 110 controls conveyance of the sheet M by a particular amount of conveyance. By one round of main scanning processing, the CPU 110 controls the main scanning device 220 (FIG. 1) in a state where the sheet M is stopped to move the print head 240 (FIGS. 1 and 2) once in the main scanning direction (the X direction). In one round of main scanning processing, the CPU 110 further controls the head driver 230 (FIG. 1) to supply, while the print head 240 is being moved, the drive signal DS to the print head 240 so as to eject ink from the nozzles NZ of the print head 240. Consequently, in one round of main scanning processing, partial printing for printing part of the image to be printed is performed.

Figure 4:
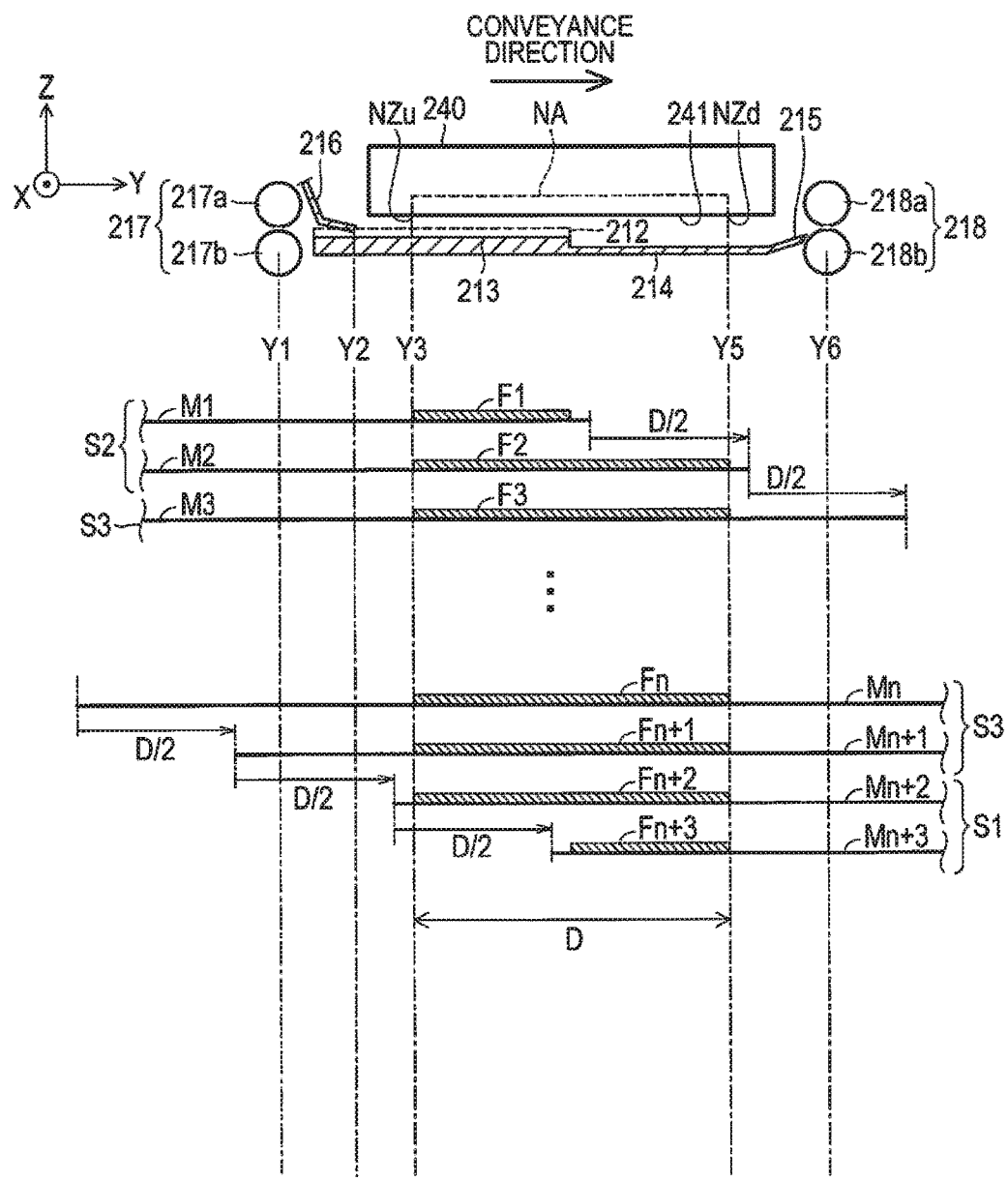
FIG. 4 is a diagram illustrating an outline of printing.

FIG. 4 is a diagram showing the positions of the sheet M with respect to the print head 240 in each round of main scanning processing. As shown in FIG. 4, it is found that each time the subscanning processing is performed, the sheet M is moved in the conveyance direction (the +Y direction) with respect to the print head 240. The position of the sheet Mk indicates the position of the sheet M when the kth round of main scanning processing is performed. FIG. 4 shows sheets M1 to M3 which is located at three positions corresponding to the first to third rounds of main scanning processing and sheets Mn to Mn+3 which is located at four positions corresponding to the nth to (n+3)th rounds of main scanning processing. Regions F1 to F3 and Fn to Fn+3 which are hatched on the sheets indicate print regions on the sheets which are printed by the corresponding rounds of main scanning processing.

As shown in FIG. 4, the printing of this example is so-called two-pass printing in which one region (for example, a partial region where a distance in the conveyance direction is D/2) on the sheet M is printed by two rounds of main scanning processing. In one round of main scanning processing, all the nozzles NZ corresponding to the nozzle length D are used to perform printing. The amount of conveyance of the sheet M by one round of subscanning processing is a half (D/2) of the nozzle length D.

Positions Y1 and Y6 in FIG. 4 are positions in the Y direction in which the sheet is held by the upstream roller pair 217 and the downstream roller pair 218. A position Y2 is a position in the Y direction in which the sheet is held by the high support members 212 and the pressing members 216. Positions Y3 and Y5 are the positions in the Y direction of the most upstream nozzle NZu and the most downstream nozzle NZd in the print head 240, respectively. By one round of main scanning processing, printing is performed at the maximum in a range from the position Y3 to the position Y5. The upstream roller pair 217, the high support members 212, and the pressing members 216 are an upstream holder which is provided at the upstream side of the print head 240 in the conveyance direction and which holds the sheet M. The downstream roller pair 218 is a downstream holder which is provided at the downstream side of the print head 240 in the conveyance direction and which holds the sheet M.

In the first to third rounds of main scanning processing, printing is performed on a portion in the vicinity of the downstream end (the end in the +Y direction, hereinafter simply referred to as the downstream end) of the sheet M in the conveyance direction. In the nth to the (n+3)th (n is an integer of three or more) rounds of main scanning processing, printing is performed on a portion in the vicinity of the upstream end (the end in the −Y direction, hereinafter simply referred to as the upstream end) of the sheet M in the conveyance direction. In the fourth to the (n−1)th rounds of main scanning processing (not shown), printing is performed on a middle portion of the sheet M in the conveyance direction.

Here, in the first and second rounds of main scanning processing, the downstream end of the sheet M is located at the −Y side with respect to the position Y6 held by the downstream roller pair 218. Hence, the first and second rounds of main scanning processing are performed in a second state S2 (FIG. 4) where the sheet M is held by the upstream holder (the upstream roller pair 217, the high support members 212, and the pressing members 216) and is not held by the downstream holder (the downstream roller pair 218).

In the third to the (n+1)th rounds of main scanning processing, the downstream end of the sheet M is located at the +Y side with respect to the position Y6 held by the downstream roller pair 218, and the upstream end of the sheet M is located at the −Y side with respect to the position Y1 held by the upstream roller pair 217. Hence, the third to the (n+1)th rounds of main scanning processing are performed in a third state S3 (FIG. 4) where the sheet M is held by the upstream holder and is also held by the downstream holder.

In the (n+2)th and (n+3)th rounds of main scanning processing, the upstream end of the sheet M is located at the +Y side with respect to the position Y2 held by the high support members 212 and the pressing members 216. Hence, the (n+2)th and (n+3)th rounds of main scanning processing are performed in a first state S1 (FIG. 4) where the sheet M is not held by the upstream holder and is held by the downstream holder.

In the first state S1 and the second state S2, printing is performed in a state where only one of the upstream side and the downstream side of a print portion of the sheet M is held, and thus in the print portion, the position of the sheet M in the Z direction and the position in the Y direction become unstable. Hence, in the vicinity of the upstream end and the downstream end of the sheet M on which printing is performed in the first state S1 and the second state S2, the positions where the dots are formed tend to be displaced. Therefore, in the vicinity of the upstream end and the downstream end of the sheet M on which printing is performed in the first state S1 and the second state S2, as compared with the middle portion of the sheet M on which printing is performed in the third state S3, streaks which are called banding tend to occur in the print image.

Banding is more likely to occur in the vicinity of the upstream end of the sheet M on which printing is performed in the first state S1, than the vicinity of the downstream end of the sheet M on which printing is performed in the second state S2. The reason for this is as follows. When printing is performed in the vicinity of the upstream end of the sheet M, printing has already been performed on the major portion of the sheet M, and thus the major portion of the sheet M has absorbed ink. Hence, the sheet M is more likely to deform when printing is performed in the vicinity of the upstream end of the sheet M, than when printing is performed in the vicinity of the downstream end of the sheet M. In this example, when printing is performed in the vicinity of the downstream end of the sheet M, the sheet M is held not only by the upstream roller pair 217 but also by the pressing members 216 and the high support members 212. When printing is performed in the vicinity of the upstream end of the sheet M, the sheet M is held only by the downstream roller pair 218. Hence, the sheet M is more likely to deform when printing is performed in the vicinity of the upstream end of the sheet M, than when printing is performed in the vicinity of the downstream end of the sheet M. Consequently, the positions where the dots are formed are more likely to be unstable and thus banding is more likely to occur when printing is performed in the vicinity of the upstream end of the sheet M, than when printing is performed in the vicinity of the downstream end of the sheet M.

A-3. Weight table WtT

Figure 5:
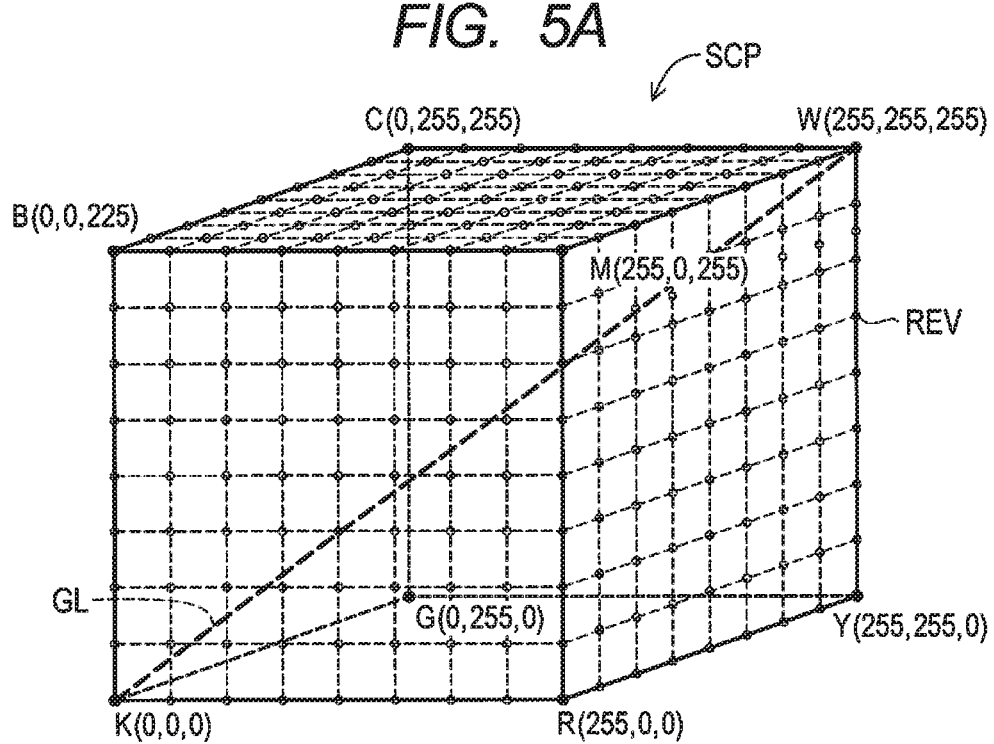
FIGS. 5A and 5B are explanatory diagrams illustrating a weight table WtT.

Next, the weight table WtT which is used in print processing to be described later will be described. FIG. 5A shows an example of an RGB color space SCP. FIG. 5B shows an example of the weight table WtT. The weight table WtT is information which indicates a correspondence between a plurality of RGB values and weights Wt corresponding to the RGB values. The RGB value is a color value in the RGB color space, and includes three component values of red (R), green (G), and blue (B) (R value, G value, and B value).

Specifically, the weight table WtT is a lookup table (FIG. 5B) where weights Wt which respectively correspond to 729 RGB values on the RGB color space SCP are described. The 729 RGB values are obtained by setting, in the RGB color space SCP, each of the R, G, B values to any one of nine specific values that are substantially evenly set between 0 and 255. Here, the nine specific values are zero and eight values represented by 32×n−1 (n is integers of 1≤n≤8). In other words, when the RGB color space SCP is expressed by a three-dimensional orthogonal coordinate system, the 729 RGB values are arranged in a color region indicated by a cube in the shape of an equidistant lattice (FIG. 5A). In the following description, the 729 RGB values are referred to as the representative values REV of the RGB values or are also simply referred to as the representative values REV.

In FIG. 5A, K point (black point), R point (red point), G point (green point) and B point (blue point) indicate points whose RGB values are (0, 0, 0), (255, 0, 0), (0, 255, 0), and (0, 0, 255), respectively. Likewise, C point (cyan point), M point (magenta point), Y point (yellow point), and W point (white point) indicate points whose RGB values are (0, 255, 255), (255, 0, 255), (255, 255, 0), and (255, 255, 255), respectively. In FIG. 5A, a dashed line connecting the W point and the K point indicates an achromatic axis GL in the RGB color space SCP.

Figure 6:
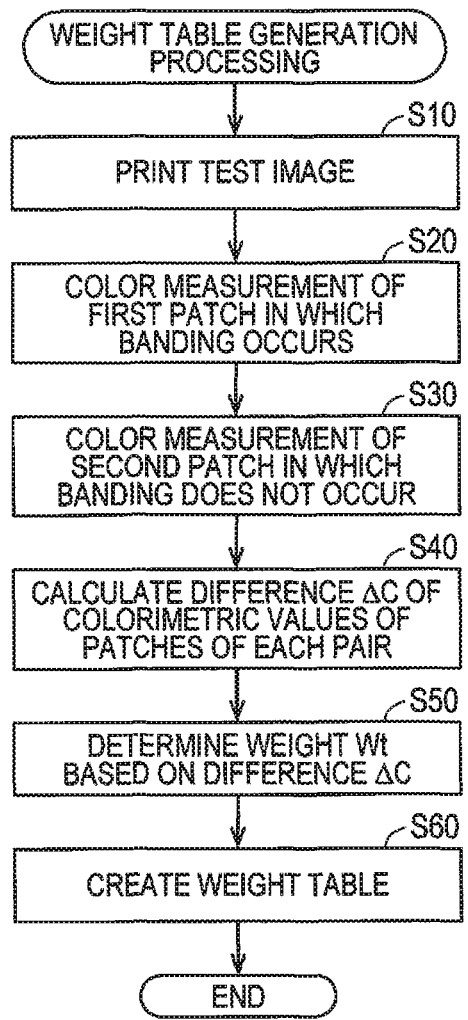
FIG. 6 is a flowchart of generation processing of the weight table WtT.

The generation processing of the weight table WtT shown in FIG. 6 is performed, for example, by the manufacturer of the printer 600 prior to shipment of the printer 600. Alternatively, the generation processing of the weight table WtT may be performed by a user of the printer 600.

Figure 7:
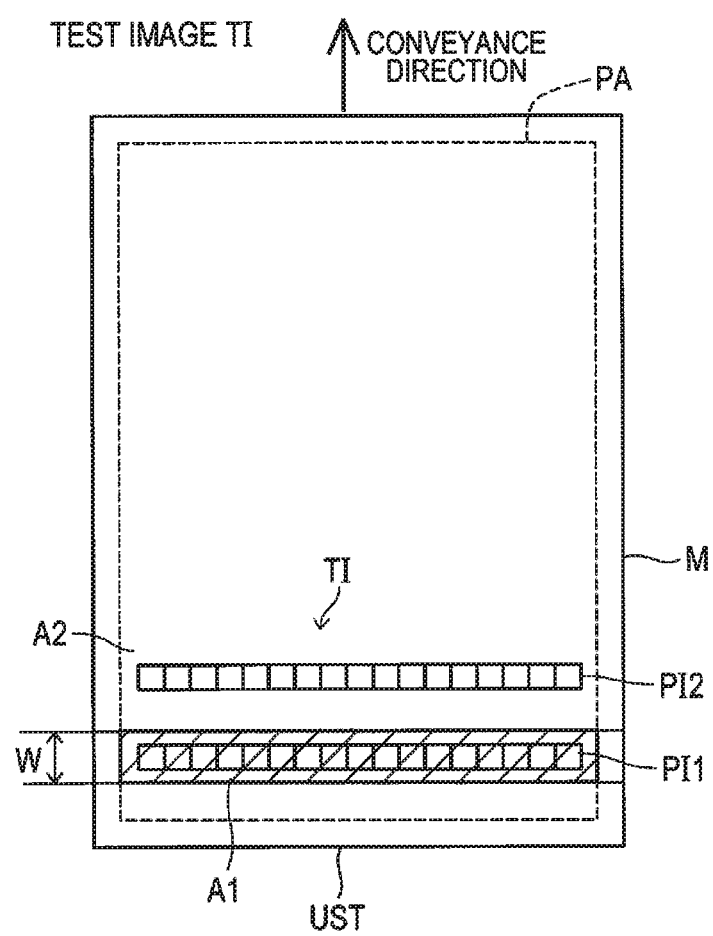
FIG. 7 is a diagram showing an example of a test image TI.

In S10, an operator uses the printer 600 to print a plurality of test images TI on the sheet M. A region which is indicated by broken lines in FIG. 7 is a printable region PA. Printing is performed in the first state S1 on an upstream vicinity region A1 in the vicinity of an upstream end UST of the sheet M in the conveyance direction in the printable region PA. Thus, the upstream vicinity region A1 is a region where banding tends to occur. The length W of the upstream vicinity region A1 in the conveyance direction and a distance from the upstream end of the printable region PA are determined beforehand by performing printing and visually identifying a region where banding tends to occur. Printing is performed in the third state S3 on a middle region A2 which is at the downstream side of the upstream vicinity region A1 in the conveyance direction. Thus, the middle region A2 is a region where banding is less likely to occur. Note that the upstream vicinity region A1 is parallel to the upstream end UST of the sheet M.

The test image TI includes a plurality of first patches PI1 which are arranged in the upstream vicinity region A1 and a plurality of second patches PI2 which are arranged in the middle region A2 and which respectively correspond to the first patches PI1. One second patch PI2 corresponding to one first patch PI1 corresponds to any one of the 729 representative values REV of the RGB values. A pair of patches PI1 and PI2 are printed by using RGB image data which has the representative values REV of the corresponding RGB values. Specifically, color conversion processing is performed on the RGB image data so as to generate CMYK image data. And, dot data which is obtained by executing half tone processing on the CMYK image data is used to print the pair of patches PI1 and PI2.

Banding occurs in the first patches PI1 arranged in the upstream vicinity region A1. In contrast, banding does not occur in the second patches PI2 arranged in the middle region A2.

The test images TI include 729 pairs of patches PI1 and PI2 which correspond to respective ones of the 729 representative values REV of the RGB values.

In S20, the operator uses a spectral colorimeter (for example, i1iSis made by X-rite Incorporated) to measure the color of each of the 729 first patches PI1 in which banding occurs. In this way, the colorimetric values of the 729 first patches PI1 are obtained. The colorimetric value is, for example, a color value (which is also referred to as a Lab value) of a CIELab color space.

In S30, the operator uses the spectral colorimeter to measure the color of each of the 729 second patches PI2 in which banding does not occur. In this way, the colorimetric values (Lab values) of the 729 second patches PI2 are obtained.

In S40, the operator calculates, for each of the 729 pairs of patches PI1 and PI2, a color difference ΔC between the colorimetric value of the first patch PI1 and the colorimetric value of the corresponding second patch PI2. The color difference ΔC is, for example, a Euclidean distance of the two colorimetric values in the CIELab color space. A larger color difference ΔC means a larger difference between the patch where banding occurs and the patch where banding does not occur. Hence, as the color difference ΔC becomes larger, when banding occurs, the banding is more noticeable. Because the color difference ΔC differs depending on the color of the image, the noticeability of the banding differs depending on the color of the image. For example, in a light color close to white, banding is relatively unnoticeable. In contrast, a dark color such as black (a color having high density) is relatively noticeable.

Figure 8:
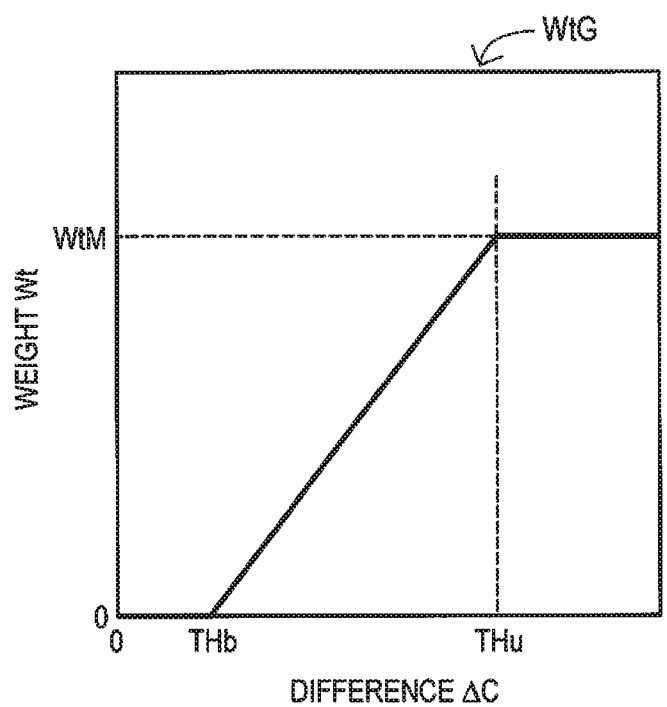
FIG. 8 is a graph showing a correspondence between a difference $\Delta C$ and a weight Wt.

In S50, the operator determines the 729 weights Wt based on the respective differences ΔC between the 729 pairs of patches PI1 and PI2. As shown in the graph WtG in FIG. 8, in a range of 0≤ΔC≤THb (THb is a particular threshold), the weight Wt is 0. In a range of THb<ΔC<THu (THu is a particular threshold), the weight Wt linearly monotonically increases from 0 to a particular upper limit value WtM as the difference ΔC increases. In a range of THu≤ΔC, the weight Wt is determined to be the upper limit value WtM.

In S60, the operator associates each of the representative 729 values REV of the RGB values with the corresponding weight Wt among the 729 weights Wt calculated in S50, thereby creates the weight table WtT. The created weight table WtT is stored in the nonvolatile memory 130.

As is understood from the above description, in the range of THb<ΔC<THu, the weight Wt for the color in which banding is more noticeable is determined to be a larger value. Hence, it can be said that, in this range, when banding of a second color is more noticeable than banding of a first color, a second weight corresponding to the second color is larger than a first weight corresponding to the first color.

A-4. Print Processing

The print processing shown in FIG. 9 is processing in which the print mechanism 200 prints a target image by using target image data. The print processing is performed by the CPU 110 of the controller 100. The print processing is started, for example, when an instruction to perform printing is acquired from the user through the operation interface 150 or a terminal apparatus (not shown).

In S100, the CPU 110 acquires the target image data which indicates the target image to be printed. The target image data is, for example, image data which is selected from a plurality of image data stored in the nonvolatile memory 130 based on the instruction of the user. Alternatively, the target image data is image data which is transmitted from the terminal apparatus (not shown) together with the instruction to perform printing. The target image data is, for example, image data which is generated by an application program such as document production or image generation. Alternatively, the target image data may be, for example, read image data which is generated by the optical reading of a document with an image sensor by a scanner or digital camera (not shown).

The target image data acquired in this example includes a plurality of pixel values, and each pixel value indicates the color of the pixel as the RGB values. In other words, the target image data is the RGB image data. The RGB value of one pixel includes, for example, three component values of red (R), green (G), and blue (B) (hereinafter also referred to as R value, G value, and B value). When the acquired target image data is not the RGB image data, for example, conversion processing such as rasterization processing is performed on the target image data to convert the target image data into the RGB image data.

Figure 10A:
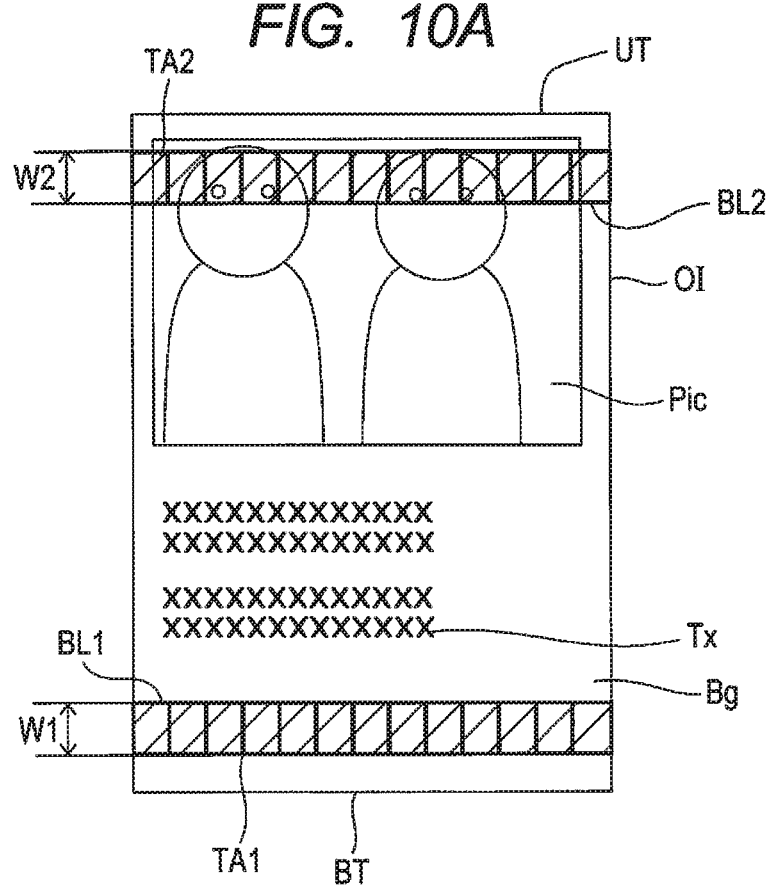
FIGS. 10A to 10C are diagrams showing an example of an image which is used in the print processing.

FIG. 10A shows an example of a target image OI indicated by the target image data. The target image OI includes objects such as a picture Pic and characters Tx and a background Bg.

Figure 10B:
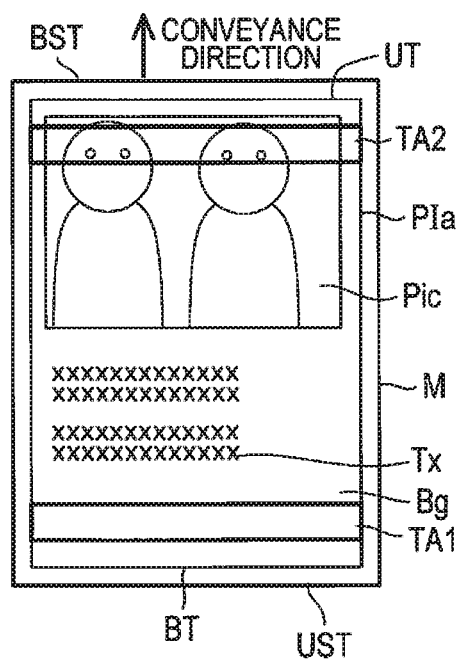
Figure 10C:
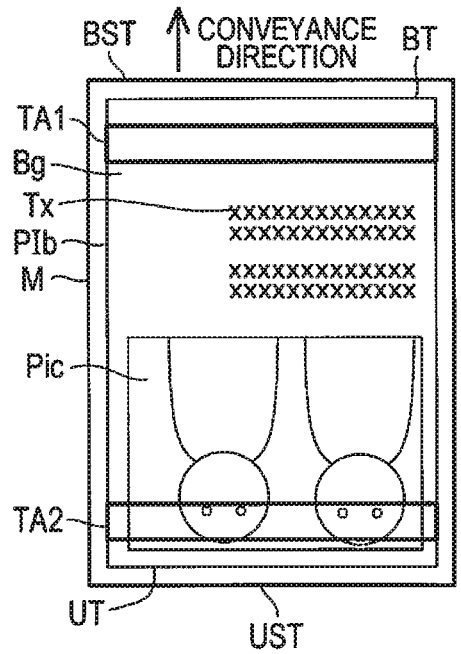

In S120, the CPU 110 performs print orientation determination processing. The print orientation determination processing is processing for determining the orientation of a print image with respect to the sheet M when the print image based on the target image OI is printed on the sheet M. FIGS. 10B and 10C show examples of print images PIa and PIb, respectively. The print image PIa of FIG. 10B is an image for performing printing on the sheet M without rotating the target image OI. In the print image PIa, an upper end UT of the image is located at the downstream side in the conveyance direction of the sheet M, and a lower end BT of the image is located at the upstream side in the conveyance direction of the sheet M. The print image PIb of FIG. 10C is an image for performing printing on the sheet M by rotating the target image OI by 180 degrees. In the print image PIb, the upper end UT of the image is located at the upstream side in the conveyance direction of the sheet M, and the lower end BT of the image is located at the downstream side in the conveyance direction of the sheet M. The print orientation determination processing determines which one of the print image PIa of FIG. 10B and the print image PIb of FIG. 10B is to be printed. In other words, the print orientation determination processing determines whether the print image PIa is printed without executing the rotation processing on the target image OI or the print image PIb is printed after the rotation processing of rotating the target image OI by 180 degrees is performed.

In S130, the CPU 110 determines whether it is determined in the print orientation determination processing that the rotation processing is to be performed. When it is determined that the rotation processing is to be performed (S130: Yes), in S140 the CPU 110 performs, on the target image data, the rotation processing of rotating the target image OI by 180 degrees. When it is determined that the rotation processing is not to be performed (S130: No), the CPU 110 skips S140.

In S150, the CPU 110 performs the color conversion processing on the target image data (RGB image data). The color conversion processing is processing in which each of the RGB values of a plurality of pixels included in the target image data is converted into CMYK values by using a color conversion profile. The CMYK value is a color value in a CMYK color space, and includes four component values of cyan (C), magenta (M), yellow (Y), and black (K) (C value, M value, Y value, and K value). The four component values of the CMYK value correspond to the four types of ink (the C ink, the M ink, the Y ink and the K ink) used in the print mechanism 200. The color conversion profile is, for example, a lookup table for specifying a correspondence between the RGB values and the CMY values. In this way, CMYK image data which includes the CMYK values of a plurality of pixels is generated.

In S160, the CPU 110 performs the half tone processing on the generated CMYK image data, and generates dot data which indicates a dot formation state for each pixel and for each color of ink. The half tone processing is performed by using a known method such as an error diffusion method or a dither method. The value of the pixel of the dot data indicates at least whether a dot is present. The value of the pixel of the dot data may indicate not only whether a dot is present but also the type of dot (for example, a size). Specifically, the value of each pixel included in the dot data may indicate any one of two dot formation states which are "with a dot" and "no dot" or may indicate any one of four dot formation states which are "a large dot", "a medium dot", "a small dot", and "no dot".

In S170, the CPU 110 uses the dot data to generate print data. For example, the CPU 110 performs processing for rearranging the dot data in an order in which the dot data is used when printing is performed with the print mechanism 200 and processing for adding a printer control code and a data identification code to the dot data, and thereby generates the print data. In S180, the CPU 110 uses the generated print data and controls the print mechanism 200 to print an image. Consequently, the print image PIa (FIG. 10B) or the print image PIb (FIG. 10C) is printed on the sheet M.

As is understood from the above description, the processing in S140 to S180 which is performed when the rotation processing in S140 is performed, that is, the processing for printing the print image PIb of FIG. 10C is an example of first print processing. The processing in S150 to S180 which is performed when the rotation processing in S140 is not performed, that is, the processing for printing the print image PIa of FIG. 10B is an example of second print processing.

A-5. Print Orientation Determination Processing

The print orientation determination processing of S120 in FIG. 9 will be described while referring to the flowchart of FIG. 11.

In S200, the CPU 110 acquires the weight table WtT from the nonvolatile memory 130. The acquired weight table WtT is temporarily stored in the buffer region 125.

In S210, the CPU 110 identifies a lower end region TA1 of the target image OI. The lower end region TA1 is a region in the vicinity of the lower end BT of the target image OI. When the rotation processing is not performed, an image in the lower end region TA1 is printed in the first state S1 in the vicinity of the upstream end of the sheet M. When the rotation processing is performed, the image in the lower end region TA1 is printed in the second state S2 in the vicinity of the downstream end of the sheet M. Hence, in a case where the rotation processing is not performed, banding tends to occur in the image in the lower end region TA1 when printing is performed. The position and the width W1 of the lower end region TA1 in a direction (the longitudinal direction of FIG. 10A) corresponding to the conveyance direction are determined beforehand. As shown in FIG. 10A, the lower end region TA1 is a belt-shaped region parallel to the lower end BT of the target image OI. In an example shown in FIG. 10A, there is an interval between the lower end region TA1 and the lower end BT. Alternatively, the lower end region TA1 may be provided along the lower end BT without an interval between the lower end region TA1 and the lower end BT.

In S215, the CPU 110 divides the lower end region TA1 into a plurality of blocks BL1. For example, in this example, the lower end region TA1 is divided into M (M is an integer of two or more) blocks BL1 which are aligned in a direction (the lateral direction of FIG. 10A) perpendicular to the conveyance direction. M is, for example, 10 to 20.

In S220, the CPU 110 calculates a color evaluation value CV1 for each of the M blocks BL1. Specifically, the CPU 110 determines n weights Wt(n) corresponding to the RGB values of n (n is an integer of two or more) pixels within the block BL1. The weight Wt(n) corresponding to the RGB value of each pixel is determined by interpolation computation using a plurality of weights Wt corresponding to a plurality of representative values REV close to that RGB value, among the 729 weights Wt specified in the weight table WtT. The CPU 110 calculates the average of the n weights Wt(n) corresponding to the RGB values of the n pixels within the block BL1 (that is, a weight Wt_av per pixel) as the color evaluation value CV1 of the block BL1.

In S225, the CPU 110 calculates an average CV1ave of the M color evaluation values CV1 of the M blocks BL1. It can be said that the average CV1ave is the color evaluation value of the lower end region TA1, and the value thereof increases as the lower end region TA1 has a color in which banding is more noticeable.

In S230, the CPU 110 calculates a variance $\sigma1^2$ of the M color evaluation values CV1 of the M blocks BL1. The variance $\sigma1^2$ is calculated by using Formula (1) below. CV1ave represents the average of the M color evaluation values CV1 described above. CV1$i$ ($i$ is an integer larger than or equal to one and smaller than or equal to M) represents the M color evaluation values CV1.

$$\sigma1^2 = \frac{1}{M}\sum_{i=1}^{M}(CV1i - CV1ave)^2 \quad (1)$$

As the variance $\sigma1^2$ increases, the unevenness of the image increases, and thus the uniformity of the image is lowered. It can be said that the variance $\sigma1^2$ is an evaluation value for the uniformity of the image. The fact that the variance $\sigma1^2$ is lower than or equal to a standard means that the uniformity of the image indicated by the variance $\sigma1^2$ is higher than or equal to a standard.

In S235, the CPU 110 identifies an upper end region TA2 of the target image OI. The upper end region TA2 is a region in the vicinity of the upper end UT of the target image OI. When the rotation processing is not performed, an image in the upper end region TA2 is printed in the second state S2 in the vicinity of the downstream end of the sheet M (FIG. 4). When the rotation processing is performed, the image in the upper end region TA2 is printed in the first state S1 in the vicinity of the upstream end of the sheet M. Hence, in a case where the rotation processing is not performed, banding is less likely to occur in the image in the upper end region TA2 than in the lower end region TA1. The position and the width W2 of the upper end region TA2 in the direction (the longitudinal direction of FIG. 10A) corresponding to the conveyance direction are determined beforehand. As shown in FIG. 10A, the upper end region TA2 is a belt-shaped region parallel to the upper end UT of the target image OI. In an example shown in FIG. 10A, there is an interval between the upper end region TA2 and the upper end UT. Alternatively, the upper end region TA2 may be provided along the upper end UT without an interval between the upper end region TA2 and the upper end UT.

In S240, the CPU 110 divides the upper end region TA2 into a plurality of blocks BL2. For example, in this example, as with the lower end region TA1, the upper end region TA2 is divided into M blocks BL2 which are aligned in the direction (the lateral direction of FIG. 10A) perpendicular to the conveyance direction.

In S245, the CPU 110 calculates a color evaluation value CV2 for each of the M blocks BL2. The calculation of the color evaluation value CV2 is performed as with the color evaluation value CV1 in S220. Specifically, the CPU 110 determines, by referring to the weight table WtT, n weights Wt(n) corresponding to the RGB values of n (n is an integer of 2 or more) pixels within the blocks BL2. The CPU 110 calculates the average of the n weights (that is, a weight Wt_av per pixel) as the color evaluation value CV2 of the blocks BL2.

In S250, the CPU 110 calculates the average CV2ave of the M color evaluation values CV2 of the M blocks BL2. It can be said that the average CV2*ave* is the color evaluation value of the upper end region TA2, and the value thereof increases as the upper end region TA2 has a color in which banding is more noticeable.

In S255, the CPU 110 calculates a variance $\sigma 2^2$ of the M color evaluation values CV2 of the M blocks BL2. The variance $\sigma 2^2$ is calculated by using Formula (2) below. CV2*ave* represents the average of the M color evaluation values CV2 described above. CV2*i* (i is an integer larger than or equal to one and smaller than or equal to M) represents the M color evaluation values CV2.

$$\sigma 2^2 = \frac{1}{M} \sum_{i=1}^{M} (CV2i - CV2ave)^2 \quad (2)$$

In S260, the CPU 110 calculates a difference between the averages of the color evaluation values of the two end regions, that is, a difference $\Delta CV$ (=CV2*ave* minus CV1*ave*) between the average CV1*ave* of the color evaluation value CV1 of the lower end region TA1 and the average CV2*ave* of the color evaluation value CV2 of the upper end region TA2.

In step S265 to S275, particular conditions for determining whether to perform the rotation processing are determined. Specifically, in S265, the CPU 110 determines whether the absolute value of the difference $\Delta CV$ is larger than or equal to a threshold TH1.

When the absolute value of the difference $\Delta CV$ is larger than or equal to the threshold TH1 (S265: Yes), in S270 the CPU 110 determines whether the average CV1*ave* of the color evaluation value of the lower end region TA1 is larger than or equal to the average CV2*ave* of the color evaluation value of the upper end region TA2. In other words, the CPU 110 determines, in terms of color, whether banding in the color of the lower end region TA1 is more noticeable than banding in the color of the upper end region TA2. When the absolute value of the difference $\Delta CV$ is larger than or equal to the threshold TH1, it is considered that there is a significant difference in how easily banding occurs between the color of the lower end region TA1 and the color of the upper end region TA2. Hence, in this case, it is considered preferable, in terms of color, to determine whether to perform the rotation processing.

When the average CV1*ave* of the color evaluation value of the lower end region TA1 is larger than or equal to the average CV2*ave* of the color evaluation value of the upper end region TA2 (S270: Yes), in S280 the CPU 110 determines that the rotation processing is to be performed. In this case, it is determined that banding in the color of the lower end region TA1 is more noticeable than banding in the color of the upper end region TA2. Hence, in this case, it is preferable to perform the rotation processing such that the image in the upper end region TA2 in which banding is less noticeable is printed at the upstream side of the sheet M in which banding is more likely to occur.

When the average CV1*ave* of the color evaluation value of the lower end region TA1 is smaller than the average CV2*ave* of the color evaluation value of the upper end region TA2 (S270: No), in S285 the CPU 110 determines that the rotation processing is not to be performed. In this case, it is determined that banding in the color of the lower end region TA1 is less noticeable than banding in the color of the upper end region TA2. In this case, it is preferable not to perform the rotation processing such that the image in the lower end region TA1 is printed at the upstream side of the sheet M in which banding is more likely to occur.

When the absolute value of the difference $\Delta CV$ is smaller than the threshold TH1 (S265: No), in S275 the CPU 110 determines whether the variance $\sigma 1^2$ of the lower end region TA1 is smaller than or equal to the variance $\sigma 2^2$ of the upper end region TA2. In other words, the CPU 110 determines whether the uniformity of the image in the lower end region TA1 is higher than or equal to the uniformity of the image in the upper end region TA2. In other words, it is determined whether banding in the lower end region TA1 is more noticeable than banding in the upper end region TA2 in terms of the uniformity of the image. When the absolute value of the difference $\Delta CV$ is smaller than the threshold TH1, it is considered that there is no significant difference in how easily banding occurs between the color of the lower end region TA1 and the color of the upper end region TA2. Hence, in this case, it is considered that it is preferable to determine whether to perform the rotation processing in terms of the uniformity of the image.

When the variance $\sigma 1^2$ of the lower end region TA1 is smaller than or equal to the variance $\sigma 2^2$ of the upper end region TA2 (S275: Yes), in S280 the CPU 110 determines that the rotation processing is to be performed. In this case, in terms of the uniformity of the image, it is determined that banding in the lower end region TA1 is more noticeable than banding in the upper end region TA2. Hence, in this case, it is preferable to perform the rotation processing such that the image in the upper end region TA2 in which banding is less noticeable is printed at the upstream side of the sheet M in which banding is more likely to occur.

When the variance $\sigma 1^2$ of the lower end region TA1 is larger than the variance $\sigma 2^2$ of the upper end region TA2 (S275: No), in S285 the CPU 110 determines that the rotation processing is not to be performed. In this case, in terms of the uniformity of the image, it is determined that banding in the lower end region TA1 is less noticeable than banding in the upper end region TA2. In this case, it is preferable not to perform the rotation processing such that the image in the lower end region TA1 is printed at the upstream side of the sheet M in which banding is more likely to occur.

As described above, the particular condition for determining whether to perform the rotation processing includes Conditions A to C below.

Condition A: The absolute value of the difference $\Delta CV$ between the average CV1*ave* of the color evaluation value CV1 of the lower end region TA1 and the average CV2*ave* of the color evaluation value CV2 of the upper end region TA2 is larger than or equal to the threshold TH1 (S265).

Condition B: The average CV1*ave* of the color evaluation value CV1 of the lower end region TA1 is larger than or equal to the average CV2*ave* of the color evaluation value CV2 of the upper end region TA2 (S270).

Condition C: The variance $\sigma 1^2$ of the lower end region TA1 is smaller than or equal to the variance $\sigma 2^2$ of the upper end region TA2 (the uniformity of the lower end region TA1 is higher than or equal to the uniformity of the upper end region TA2).

When Condition A is satisfied and Condition B is satisfied, it is determined that the particular condition is satisfied. Alternatively, when Condition A is not satisfied and Condition C is satisfied, it is determined that the particular condition is satisfied.

Figure 11:
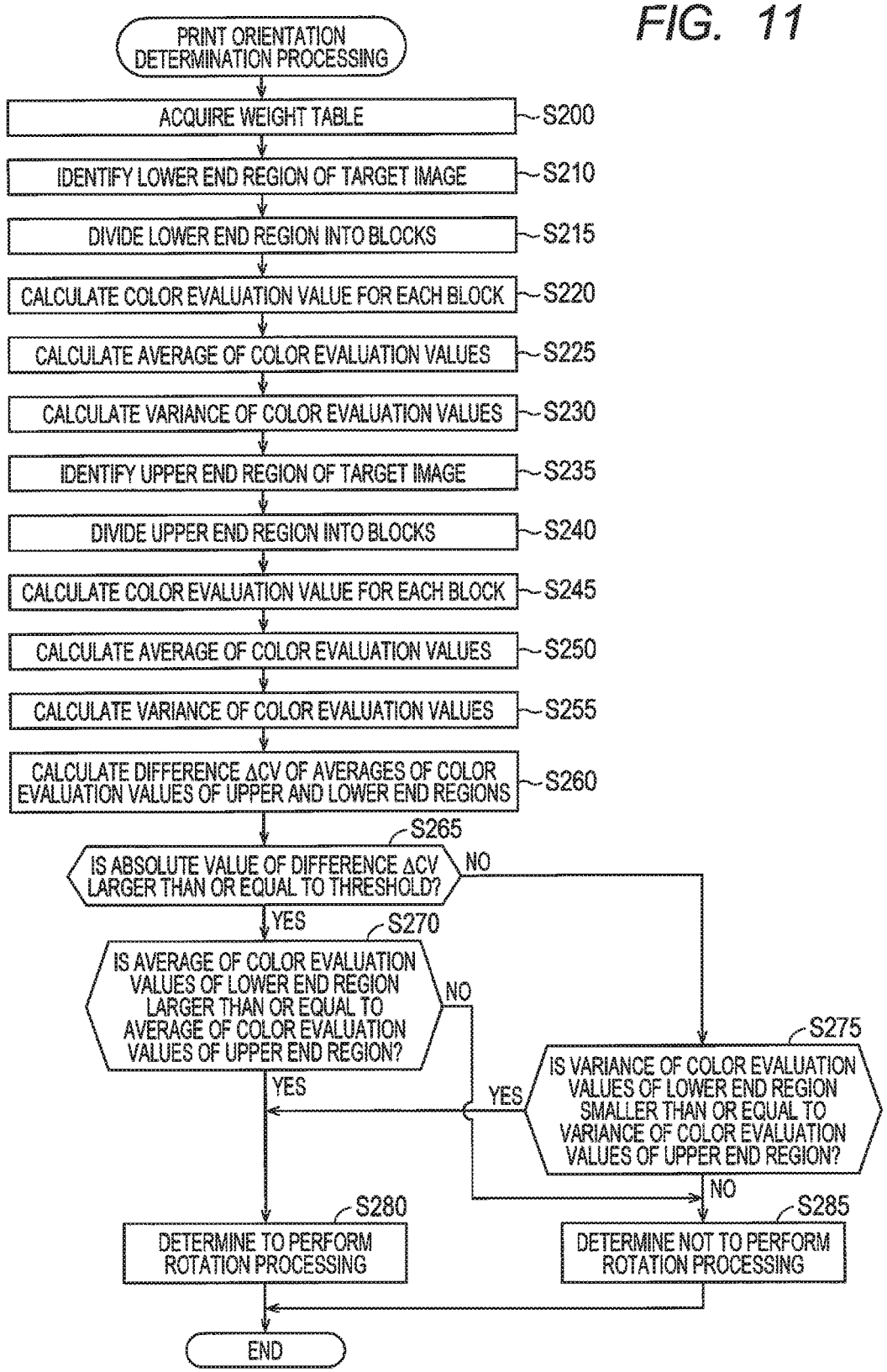
FIG. 11 is a flowchart of print orientation determination processing.

According to the embodiment described above, by using the target image data, the variance $\sigma 1^2$ of the color evaluation value CV1 is calculated as the evaluation value of the image to be printed in the lower end region TA1 of the target image OI, the lower end region TA1 being parallel to one end of the sheet M (S230 in FIG. 11). The variance $\sigma 1^2$ is the evaluation value which indicates the degree of uniformity of the image in the lower end region TA1. It is determined, by using the evaluation value including the variance $\sigma 1^2$, whether the first print processing which includes the rotation processing needs to be performed or whether the second print processing which does not include the rotation processing needs to be performed (S265 to S275). In the first print processing, the image in the lower end region TA1 is printed in the vicinity of the downstream end of the sheet M in which banding is less likely to occur than in the vicinity of the upstream end of the sheet M. Hence, the first print processing is processing in which banding is less likely to occur in the image in the printed lower end region TA1 than the second print processing. Specifically, when the particular condition including Condition C that the uniformity of the lower end region TA1 is higher than or equal to the standard is satisfied, the first print processing is performed. When the particular condition is not satisfied, the second print processing is performed.

As the uniformity of the image in the lower end region TA1 is higher, banding in the image in the printed lower end region TA1 is more noticeable. Hence, as the uniformity of the image in the lower end region TA1 is higher, there is higher necessity to suppress the occurrence of banding. In the configuration described above, when the particular condition including Condition C that the uniformity of the image in the lower end region TA1 indicated by the variance $\sigma 1^2$ is higher than or equal to the standard is satisfied, the first print processing is performed in which banding is less likely to occur in the image of the lower end region TA1 than the second print processing. Consequently, the occurrence of banding in the image of the lower end region TA1 which is printed on the sheet M is appropriately suppressed.

In the embodiment described above, the variance $\sigma 2^2$ of the color evaluation value CV2 is calculated as the evaluation value of the image to be printed in the upper end region TA2 of the target image OI, the upper end region TA2 being parallel to the other end of the sheet M (S255 in FIG. 11). The variance $\sigma 2^2$ is the evaluation value which indicates the degree of uniformity of the image in the upper end region TA2. The Condition C described above is that the uniformity of the lower end region TA1 indicated by the variance $\sigma 1^2$ is higher than or equal to the uniformity of the upper end region TA2 indicated by the variance $\sigma 2^2$. Consequently, when it is determined that banding in the lower end region TA1 is more noticeable by comparison between the lower end region TA1 and the upper end region TA2, the occurrence of banding in the lower end region TA1 is suppressed.

In the embodiment described above, the weight table WtT is acquired which is weight information indicating weights that correspond to respective ones of a plurality of color values represented in the RGB color space (S200 in FIG. 11). The color evaluation value CV1 is calculated for each of the M blocks BL1 by using the weights Wt in the weight table WtT and the color values (RGB values) indicative of the colors of the image in the lower end region TA1 (S220 in FIG. 11), and the variance $\sigma 1^2$ indicative of the unevenness of the M color evaluation values CV1 is calculated as the evaluation value of the uniformity of the lower end region TA1 (S230 in FIG. 11). Consequently, the variance $\sigma 1^2$ which is the evaluation value of the uniformity is calculated by using the weights Wt which correspond to respective ones of a plurality of RGB values. Thus, the print processing which needs to be performed is more appropriately determined.

In the embodiment described above, the average CV1ave of the M color evaluation values CV1 is calculated (S225 in FIG. 11). The particular condition for determining whether to perform the rotation processing further include Condition B in which the average CV1ave of the color evaluation values of the lower end region TA1 is larger than or equal to the average CV2ave of the color evaluation values of the upper end region TA2. Consequently, the print processing is determined by using the average CV1ave of the color evaluation values of the lower end region TA1. Thus, the print processing which needs to be performed is more appropriately determined. More specifically, although how banding is noticeable differs depending on the color of the image in the lower end region TA1, a degree of noticeability of banding (how much banding is noticeable) is appropriately evaluated by using the average CV1ave of the color evaluation values of the lower end region TA1. Hence, the print processing which needs to be performed is determined by appropriately considering the degree of noticeability of banding.

In the embodiment described above, when it is determined that at least one of Condition C and Condition B described above is satisfied (S270: Yes or S275: Yes), it is determined that the particular condition for determining whether to perform the rotation processing is satisfied. Consequently, the print processing which needs to be performed is determined by appropriately considering one of the color and the uniformity of the lower end region TA1.

In the embodiment described above, the color evaluation value CV1 is calculated for each of the blocks BL1 including the n pixels. Consequently, as compared with a case where the color evaluation value CV1 is calculated per pixel, the calculation load of the evaluation values such as the variances and the averages is reduced, and the appropriate evaluation values are calculated.

In the embodiment described above, the target image data is used to calculate, as the evaluation value of the image in the lower end region TA1, the average CV1ave which is the evaluation value calculated by using the weights and the color values (S220 to S230). Then, the evaluation value including the average CV1ave is used to determine whether to perform the first print processing which includes the rotation processing or to perform the second print processing which does not include the rotation processing (S265 to S275). Specifically, when the particular condition including Condition B that the average CV1ave in the lower end region TA1 is larger than or equal to the standard is satisfied, the first print processing including the rotation processing is performed.

The degree of noticeability of banding which occurs in the image of the printed lower end region TA1 differs depending on the color printed in the lower end region TA1. Hence, when the color printed in the lower end region TA1 is a color in which banding is more noticeable, it is highly necessary to suppress the occurrence of banding. In the embodiment described above, the average CV1ave in the lower end region TA1 is calculated as the evaluation value which is calculated by using the weight corresponding to the degree of noticeability of banding. When the particular condition including Condition B that the average CV1ave is larger than or equal to the standard is satisfied, the first print processing including the rotation processing is performed.

Thus, the occurrence of banding in the image of the lower end region TA1 which is printed on the sheet M is appropriately suppressed.

In the embodiment described above, the average CV2*ave* in the upper end region TA2 is calculated as the evaluation value of the image to be printed in the upper end region TA2 of the target image OI, the upper end region TA2 being parallel to the other end of the sheet M (S250 in FIG. 11). Condition B described above is that the average CV1*ave* in the lower end region TA1 is larger than or equal to the average CV2*ave* in the upper end region TA2. Consequently, when it is determined that banding in the lower end region TA1 is more likely to occur by comparison between the lower end region TA1 and the upper end region TA2, the occurrence of banding in the image of the lower end region TA1 is suppressed.

In the embodiment described above, the first print processing is print processing which includes the rotation processing. In other words, the first print processing is processing in which the image in the lower end region TA1 is printed parallel to or along the downstream end BST of the sheet M and in which the image in the upper end region TA2 is printed parallel to or along the upstream end UST of the sheet (FIG. 10C). The second print processing is the print processing which does not include the rotation processing. In other words, the second print processing is processing in which the image in the lower end region TA1 is printed parallel to or along the upstream end UST of the sheet M and in which the image in the upper end region TA2 is printed parallel to or along the downstream end BST of the sheet (FIG. 10B). Consequently, when it is determined that banding in the lower end region TA1 is more likely to occur by comparison between the lower end region TA1 and the upper end region TA2, the occurrence of banding in the lower end region TA1 is easily suppressed only by rotating the image.

B. Modifications

While the disclosure has been described in detail with reference to the above aspects thereof, it would be apparent to those skilled in the art that various changes and modifications may be made therein without departing from the scope of the claims.

(1) In the embodiment described above, the first print processing is the print processing which includes the rotation processing, and the second print processing is the print processing which does not include the rotation processing. Without being limited to this configuration, the first print processing may be another type of processing in which banding in the image of the lower end region TA1 is less likely to occur than the second print processing. For example, the first print processing may be processing of adjusting a conveyance amount of the sheet M such that a distance between the downstream holder and the upstream end of the sheet M in the first state S1 in the first print processing is shorter than a distance between the downstream holder and the upstream end of the sheet M in the first state S1 in the second print processing. In this first print processing, for example, because deformation of the sheet M in the vicinity of the upstream end is suppressed, banding of an image in the lower end region TA1 that is printed in the vicinity of the upstream end of the sheet M is less likely to occur than in the second print processing. The details of this print processing are disclosed in U.S. Patent Application Publication No. US 2015/0035891 A1 corresponding to U.S. patent application Ser. No. 14/333,899 filed Jul. 17, 2014 (based on Japanese Patent Application No. 2013-160005 filed Jul. 31, 2013). The entire content of U.S. patent application Ser. No. 14/333,899 is incorporated herein by reference.

(2) In the embodiment described above, the switching between the first print processing and the second print processing is performed in order to suppress the occurrence of banding in the image which is printed in the vicinity of the upstream end of the sheet M. Alternatively, the switching of the first print processing and the second print processing may be performed in order to suppress the occurrence of banding in the image which is printed in the vicinity of the downstream end of the sheet M. For example, the first print processing may be processing in which the amount of conveyance of the sheet M is adjusted to reduce the distance from the upstream holder to the downstream end of the sheet M in the second state S2 as compared with the second print processing. For example, refer to U.S. Patent Application Publication No. US 2015/0035891 A1 (Japanese Patent Application Publication No. 2015-30149). In this case, for example, when the uniformity of the image in the upper end region TA2 which is printed in the vicinity of the downstream end of the sheet M is higher than or equal to a particular reference value, the first print processing is performed. On the other hand, when the uniformity of the image in the upper end region TA2 is lower than the particular reference value, the second print processing is performed. Alternatively, for example, when the average CV2*ave* in the upper end region TA2 which is printed in the vicinity of the downstream end of the sheet M is larger than or equal to a particular reference value, the first print processing is performed. On the other hand, when the average CV2*ave* in the upper end region TA2 is smaller than the particular reference value, the second print processing is performed.

(3) In the embodiment described above, the variance $\sigma 1^2$ of the M color evaluation values CV1 is calculated as the evaluation value which indicates the unevenness of the image in the lower end region TA1 (S230 in FIG. 11). Alternatively, for example, the variance or the standard deviation of the M average color values of the M blocks BL1 calculated without using the weight Wt may be calculated. Alternatively, the variance or the standard deviation of the color values of a plurality of pixels which are extracted from the lower end region TA1 randomly or according to a particular rule may be calculated, or the maximum value of a Euclidean distance between the respective color values may be calculated.

(4) In the embodiment described above, the average CV1*ave* of the M color evaluation values CV1 is calculated as the evaluation value of the color of the image in the lower end region TA1 (S225 in FIG. 11). Alternatively, the median of the M color evaluation values CV1 may be calculated. Alternatively, for example, a value which is obtained by multiplying an average color value in the lower end region TA1 by the weight Wt corresponding to the average color value may be calculated. Alternatively, M values which are obtained by multiplying the average color values of the M blocks BL1 by the weight Wt corresponding to the average color value may be calculated, and the average or the median of the M values may be calculated.

(5) In the embodiment described above, the two types which are the variances $\sigma 1^2$, $\sigma 2^2$ and the averages CV1*ave*, CV2*ave* are used as the evaluation values of the lower end region TA1 and the upper end region TA2. Alternatively, only the variances $\sigma 1^2$, $\sigma 2^2$ may be used. In this case, for example, S225, S250, S260, S265 and S270 in FIG. 11 may be omitted. When the variance $\sigma 1^2$ of the lower end region TA1 is smaller than or equal to the variance $\sigma 2^2$ of the upper end region TA2, the first print processing which includes the rotation processing is performed. When the variance $\sigma1^2$ of the lower end region TA1 is larger than the variance $\sigma2^2$ of the upper end region TA2, the second print processing which does not include the rotation processing is performed.

Alternatively, only the averages CV1ave and CV2ave may be used. In this case, S230, S255, S260, S265, and S275 in FIG. 11 may be omitted. When the average CV1ave in the lower end region TA1 is larger than or equal to the average CV2ave in the upper end region TA2, the first print processing which includes the rotation processing is performed. When the average CV1ave in the lower end region TA1 is smaller than the average CV2ave in the upper end region TA2, the second print processing which does not include the rotation processing is performed.

(6) In the embodiment described above, the unit region for which the color evaluation value CV1 is calculated is one block BL1 including n pixels. Alternatively, the unit region for which the color evaluation value CV1 is calculated may be one pixel.

(7) The particular condition for determining whether to perform the rotation processing in the embodiment described above is just an example, and not limited to this example. For example, it may be determined that the particular condition is satisfied when both of Condition B and Condition C are satisfied.

(8) In the embodiment described above, Condition B is that the average CV1ave in the lower end region TA1 is larger than or equal to the average CV2ave in the upper end region TA2. In other words, it is determined whether the average CV1ave as the evaluation value of the lower end region TA1 satisfies Condition B by using the average CV2ave in the upper end region TA2 as the threshold. Alternatively, it may be determined whether the average CV1ave in the lower end region TA1 satisfies Condition B by using a fixed value as the threshold.

(9) In the embodiment described above, Condition C is that the variance $\sigma1^2$ of the lower end region TA1 is smaller than or equal to the variance $\sigma2^2$ of the upper end region TA2. In other words, it is determined whether the variance $\sigma1^2$ as the evaluation value of the lower end region TA1 satisfies Condition C by using the variance $\sigma2^2$ in the upper end region TA2 as the threshold. Alternatively, it may be determined whether the variance $\sigma1^2$ in the lower end region TA1 satisfies Condition C by using a fixed value as the threshold.

(10) In the embodiment described above, the print mechanism 200 is a serial printer which includes the main scanning device 220 and in which the print head 240 is driven during the main scanning so as to perform partial printing. Alternatively, the print mechanism 200 may be a so-called line printer which does not include the main scanning device 220 and which includes a print head having a plurality of nozzles aligned along a direction perpendicular to the conveyance direction over a length substantially equal to the width of the sheet M. In the line printer, printing is performed without performing the main scanning

(11) In the embodiment described above, the apparatus which functions as an image processing apparatus that performs the print processing of FIG. 9 is the printer 600. Alternatively, the apparatus which functions as the image processing apparatus may be another type of apparatus, for example, a terminal apparatus (not shown) of the user. In this case, for example, the terminal apparatus performs a driver program so as to operate as a printer driver, and performs the print processing of FIG. 9 as part of the function of the printer driver. In this case, the terminal apparatus supplies the printer 600 with a print job which is generated by using the print data generated in S170 of FIG. 9, thereby causing the printer 600 to perform printing.

As is understood from the above description, in the embodiment described above, the print mechanism 200 is an example of a printer (print performing device). In a case where the terminal apparatus performs the print processing, the entire printer 600 is an example of the printer (print performing device).

The image processing apparatus which performs the print processing of FIG. 9 may be, for example, a server which acquires the target image data from the printer 600 or the terminal apparatus and performs the image processing. The server as described above may be a plurality of computers which communicate with each other through a network. In this case, all the computers which communicate with each other through the network correspond to the image processing apparatus.

(12) In the embodiment described above, part of a configuration which is realized by hardware may be replaced by software. Conversely, part of a configuration which is realized by software may be replaced by hardware. For example, part of the processing which is performed by the CPU 110 of the printer 600 in FIG. 1 may be realized by a dedicated hardware circuit.

What is claimed is:

1. A controller for a printer including: a print head having a plurality of nozzles configured to eject ink; a head driver configured to drive the print head to eject ink to form dots on a print medium; and a conveyor configured to convey the print medium in a conveyance direction, the conveyor including an upstream holder and a downstream holder, the upstream holder being provided at an upstream side of the print head in the conveyance direction and configured to hold the print medium, the downstream holder being provided at a downstream side of the print head in the conveyance direction and configured to hold the print medium, the printer being configured to perform printing by formation of the dots by the print head and by conveyance of the print medium by the conveyor, the controller configured to perform:
acquiring target image data indicative of a target image;
calculating a particular value of a first end image of the target image by using the target image data, the first end image being an image to be printed in a first end region parallel to a first end of the print medium, the first end being one of an upstream end and a downstream end of the print medium in the conveyance direction, the first end region including a region to be printed in one of a first holding state in which the print medium is held by the downstream holder without being held by the upstream holder and a second holding state in which the print medium is held by the upstream holder without being held by the downstream holder, the particular value including a first value indicative of a degree of uniformity of the first end image;
determining print processing to be performed by using the particular value, the determining comprising:
in response to determining that a particular condition is satisfied, determining first print processing as the print processing to be performed, the particular condition including a first condition that the uniformity of the first end image indicated by the first value is higher than or equal to a first standard; and
in response to determining that the particular condition is not satisfied, determining second print processing as the print processing to be performed, the first print processing being processing in which banding is less likely to occur in the first end image than the second print processing; and controlling the printer to print an image based on the target image data by performing the determined print processing to be performed.

2. The controller according to claim 1, wherein the controller is configured to further perform:

acquiring weight information indicative of weights for respective ones of a plurality of color values represented by a particular color space;

wherein the first end image includes a plurality of unit regions; and wherein the calculating further comprises:
calculating a plurality of region values for respective ones of the plurality of unit regions by using the weights indicated by the weight information and the plurality of color values indicative of colors in the first end image; and
calculating, as the first value, a value indicative of variation of the plurality of region values.

3. The controller according to claim 2, wherein the calculating further comprises:

calculating one of an average and a median of the plurality of region values; and wherein the particular condition includes a second condition that the one of the average and the median is higher than or equal to a second standard.

4. The controller according to claim 3, wherein the controller is configured to further perform:

in response to determining that at least one of the first condition and the second condition is satisfied, determining that the particular condition is satisfied.

5. The controller according to claim 2, wherein each of the plurality of unit regions is a block including a plurality of pixels.

6. The controller according to claim 1, wherein the calculating further comprises:

calculating a second value of a second end image of the target image by using the target image data, the second end image being an image to be printed in a second end region parallel to a second end of the print medium;

wherein the second end is an other one of the upstream end and the downstream end of the print medium;

wherein the second end region includes a region to be printed in an other one of the first holding state and the second holding state;

wherein the second value is indicative of a degree of uniformity of the second end image; and wherein the first condition is that the uniformity of the first end image indicated by the first value is higher than or equal to the uniformity of the second end image indicated by the second value.

7. The controller according to claim 6, wherein the first print processing is processing of printing the first end image in the second end region of the print medium and printing the second end image in the first end region of the print medium; and wherein the second print processing is processing of printing the first end image in the first end region of the print medium and printing the second end image in the second end region of the print medium.

8. The controller according to claim 7, wherein the first end is the upstream end in the conveyance direction; and wherein the second end is the downstream end in the conveyance direction.

9. The controller according to claim 1, wherein the first end region is a region that is parallel to the upstream end and that is to be printed in the first holding state.

10. The controller according to claim 1, wherein the printer further includes a main scanning device configured to perform a main scan of moving the print head in a main scanning direction; and wherein the head driver is configured to perform partial printing by driving the print head to form the dots during the main scan.

11. The controller according to claim 1, wherein the controller is configured to perform, as the first print processing, adjusting a conveyance amount of the print medium such that a distance between the downstream holder and the upstream end of the print medium in the first holding state in the first print processing is shorter than the distance in the second print processing.

12. A controller for a printer including: a print head having a plurality of nozzles configured to eject ink; a head driver configured to drive the print head to eject ink to form dots on a print medium; and a conveyor configured to convey the print medium in a conveyance direction, the conveyor including an upstream holder and a downstream holder, the upstream holder being provided at an upstream side of the print head in the conveyance direction and configured to hold the print medium, the downstream holder being provided at a downstream side of the print head in the conveyance direction and configured to hold the print medium, the printer being configured to perform printing by formation of the dots by the print head and by conveyance of the print medium by the conveyor, the controller configured to perform:
acquiring target image data indicative of a target image;
acquiring weight information indicative of weights for respective ones of a plurality of color values represented by a particular color space, a first weight corresponding to a first color being smaller than a second weight corresponding to a second color, banding of the second color being more noticeable than banding of the first color;
calculating a particular value of a first end image of the target image by using the target image data, the first end image being an image to be printed in a first end region parallel to a first end of the print medium, the first end being one of an upstream end and a downstream end of the print medium in the conveyance direction, the first end region including a region to be printed in one of a first holding state in which the print medium is held by the downstream holder without being held by the upstream holder and a second holding state in which the print medium is held by the upstream holder without being held by the downstream holder, the particular value including a first value that is calculated by using the weights indicated by the weight information and the plurality of color values indicative of colors in the first end image;
determining print processing to be performed by using the particular value, the determining comprising:
in response to determining that a particular condition is satisfied, determining first print processing as the print processing to be performed, the particular condition including a first condition that the first value is larger than or equal to a first standard; and
in response to determining that the particular condition is not satisfied, determining second print processing as the print processing to be performed, the first print processing being processing in which banding is less likely to occur in the first end image than the second print processing; and controlling the printer to print an image based on the target image data by performing the determined print processing to be performed.

13. The controller according to claim 12, wherein the calculating further comprises:

calculating a second value of a second end image of the target image by using the target image data, the second end image being an image to be printed in a second end region parallel to a second end of the print medium;

wherein the second end is an other one of the upstream end and the downstream end of the print medium;

wherein the second end region includes a region to be printed in an other one of the first holding state and the second holding state;

wherein the second value is calculated by using the weights indicated by the weight information and the plurality of color values indicative of colors in the second end image; and wherein the first condition is that the first value is larger than or equal to the second value.

14. The controller according to claim 13, wherein the first print processing is processing of printing the first end image in the second end region of the print medium and printing the second end image in the first end region of the print medium; and wherein the second print processing is processing of printing the first end image in the first end region of the print medium and printing the second end image in the second end region of the print medium.

15. The controller according to claim 14, wherein the first end is the upstream end in the conveyance direction; and wherein the second end is the downstream end in the conveyance direction.

16. The controller according to claim 12, wherein the first end region is a region that is parallel to the upstream end and that is to be printed in the first holding state.

17. The controller according to claim 12, wherein the printer further includes a main scanning device configured to perform a main scan of moving the print head in a main scanning direction; and wherein the head driver is configured to perform partial printing by driving the print head to form the dots during the main scan.

18. The controller according to claim 12, wherein the controller is configured to perform, as the first print processing, adjusting a conveyance amount of the print medium such that a distance between the downstream holder and the upstream end of the print medium in the first holding state in the first print processing is shorter than the distance in the second print processing.

19. A non-transitory computer-readable storage medium storing a program executable on a computer for a printer, the printer including: a print head having a plurality of nozzles configured to eject ink; a head driver configured to drive the print head to eject ink to form dots on a print medium; and a conveyor configured to convey the print medium in a conveyance direction, the conveyor including an upstream holder and a downstream holder, the upstream holder being provided at an upstream side of the print head in the conveyance direction and configured to hold the print medium, the downstream holder being provided at a downstream side of the print head in the conveyance direction and configured to hold the print medium, the printer being configured to perform printing by formation of the dots by the print head and by conveyance of the print medium by the conveyor, the program causing, when executed, the computer to perform operations comprising:

an image acquiring operation of acquiring target image data indicative of a target image;

a calculating operation of calculating a particular value of a first end image of the target image by using the target image data, the first end image being an image to be printed in a first end region parallel to a first end of the print medium, the first end being one of an upstream end and a downstream end of the print medium in the conveyance direction, the first end region including a region to be printed in one of a first holding state in which the print medium is held by the downstream holder without being held by the upstream holder and a second holding state in which the print medium is held by the upstream holder without being held by the downstream holder, the particular value including a first value indicative of a degree of uniformity of the first end image;

a processing determining operation of determining print processing to be performed by using the particular value, the processing determining operation comprising:

in response to determining that a particular condition is satisfied, determining first print processing as the print processing to be performed, the particular condition including a first condition that the uniformity of the first end image indicated by the first value is higher than or equal to a first standard; and in response to determining that the particular condition is not satisfied, determining second print processing as the print processing to be performed, the first print processing being processing in which banding is less likely to occur in the first end image than the second print processing; and a print controlling operation of controlling the printer to print an image based on the target image data by performing the determined print processing to be performed.

20. A non-transitory computer-readable storage medium storing a program executable on a computer for a printer, the printer including: a print head having a plurality of nozzles configured to eject ink; a head driver configured to drive the print head to eject ink to form dots on a print medium; and a conveyor configured to convey the print medium in a conveyance direction, the conveyor including an upstream holder and a downstream holder, the upstream holder being provided at an upstream side of the print head in the conveyance direction and configured to hold the print medium, the downstream holder being provided at a downstream side of the print head in the conveyance direction and configured to hold the print medium, the printer being configured to perform printing by formation of the dots by the print head and by conveyance of the print medium by the conveyor, the program causing, when executed, the computer to perform operations comprising:

an image acquiring operation of acquiring target image data indicative of a target image;

a weight acquiring operation of acquiring weight information indicative of weights for respective ones of a plurality of color values represented by a particular color space, a first weight corresponding to a first color being smaller than a second weight corresponding to a second color, banding of the second color being more noticeable than banding of the first color;

a calculating operation of calculating a particular value of a first end image of the target image by using the target image data, the first end image being an image to be printed in a first end region parallel to a first end of the print medium, the first end being one of an upstream end and a downstream end of the print medium in the conveyance direction, the first end region including a region to be printed in one of a first holding state in which the print medium is held by the downstream holder without being held by the upstream holder and a second holding state in which the print medium is held by the upstream holder without being held by the downstream holder, the particular value including a first value that is calculated by using the weights indicated by the weight information and the plurality of color values indicative of colors in the first end image;

a processing determining operation of determining print processing to be performed by using the particular value, the processing determining operation comprising:
  in response to determining that a particular condition is satisfied, determining first print processing as the print processing to be performed, the particular condition including a first condition that the first value is larger than or equal to a first standard; and
  in response to determining that the particular condition is not satisfied, determining second print processing as the print processing to be performed, the first print processing being processing in which banding is less likely to occur in the first end image than the second print processing; and a print controlling operation of controlling the printer to print an image based on the target image data by performing the determined print processing to be performed.

* * * * *